United States Patent [19]
Liau et al.

[11] Patent Number: 5,909,426
[45] Date of Patent: Jun. 1, 1999

[54] ORTHOGONAL LMS ALGORITHMS FOR FAST LINE ECHO CANCELER TRAINING

[75] Inventors: Thomas C. Liau, Hacienda Heights; Wei K. Tsai, Irvine, both of Calif.

[73] Assignee: Rockwell Science Center, Inc., Thousand Oaks, Calif.

[21] Appl. No.: 08/828,482

[22] Filed: Mar. 31, 1997

[51] Int. Cl.$^6$ .............................. H04B 3/23; H04M 9/08
[52] U.S. Cl. .................... 370/203; 370/286; 370/292; 379/410
[58] Field of Search ................... 370/286, 290, 370/291, 292, 203, 206, 208; 379/410, 411, 406

[56] References Cited

U.S. PATENT DOCUMENTS

| | | | |
|---|---|---|---|
| 4,089,061 | 5/1978 | Milewski | 364/724.02 |
| 4,621,173 | 11/1986 | Guidoux | 370/291 |
| 4,742,510 | 5/1988 | Quatieri, Jr. et al. | 370/290 |
| 4,977,591 | 12/1990 | Chen et al. | 379/410 |
| 4,987,569 | 1/1991 | Ling et al. | 370/292 |
| 5,289,539 | 2/1994 | Maruyama | 379/410 |
| 5,408,530 | 4/1995 | Makino et al. | 379/392 |
| 5,559,723 | 9/1996 | Mourot et al. | 375/229 |
| 5,581,494 | 12/1996 | Sommen et al. | 364/724.16 |

OTHER PUBLICATIONS

IEEE article, entitled Polyphase Codes With Good Periodic Correlation Properties by David C. Chu.
Chapter 9 entitled, "Echo Cancellation" from Data Communications Principles by Richard D. Gitlin, Jeremiah F. Hayes, and Stephen B. Weinstein.
Rohrs, U. et al., CAZAC Code Tracking Loop, COMSIG 90, Johannesburg, pp. 142–146, 1990.

*Primary Examiner*—Alpus H. Hsu
*Attorney, Agent, or Firm*—Merchant, Gould, Smith, Edell, Welter & Schmidt

[57] ABSTRACT

An echo canceler for calculating an echo impulse response during a training sequence, wherein a sequence of data samples is selected such that a full rank data correlation matrix comprised of such data samples is diagonal at the Nth iteration. The echo canceler estimates the echo impulse response based on such data samples and an echo generated during the training sequence using a normalized least means square algorithm, wherein the length of the data sequence to sound the echo channel is N. This normalized LMS algorithm, wherein the data sequence is specifically selected, converges toward an echo impulse response much faster than standard LMS algorithms, while having a computational complexity comparable to that of the standard LMS algorithm.

7 Claims, 4 Drawing Sheets

ORTHOGONAL LMS ALGORITHMS FOR FAST LINE ECHO CANCELER TRAINING

FIELD OF THE INVENTION

The present invention relates to an algorithm for training an echo canceler used in voice band modems, and in particular an echo canceler employing a variation of the Least Mean Squares (LMS) algorithm during a training sequence.

BACKGROUND OF THE INVENTION

Standard telephone lines are used for digital transmissions. A modem (modulator/demodulator) is used to transmit digital data by converting bit-serial digital quantities into analog signals which are transmitted over the telephone lines. The transmitting portion of the modem modulates the digital data into a sine wave carrier signal having a frequency within the voice transmission band. The receiving portion of the modem receives the analog signals and demodulates them back into digital data. U.S. Pat. No. 4,977,591, entitled "Dual Mode LMS Nonlinear Data Echo Canceler," to Walter Y. Chen and Richard A. Haddad and Richard D. Gitlin, Jeremiah F. Hayes, and Stephen B. Weinstein, *Data Communication Principles* 607 et seq. (1992) provide a detailed description of modem communication via the telephone channel. Both these references are incorporated herein by reference in their entirety.

A full duplex modem transmits and receives using the same bandwidth in a two-wire (bilateral) telephone channel used for both voice and data transmission. When signals are transmitted over the telephone channel an echo is generated which is added to the transmitted signal. Thus, the signal received at the receiving end includes not only the originally transmitted signal, but echo components.

The echo occurs as a result of a hybrid coupler ("hybrid") converting a four-wire loop to a two-wire loop within the telephone network. These conversion from four-wire to two wire creates an echo in the transmitted data signal which arises as a result of an impedance mismatch. This impedance mismatch causes a portion of the data signal generated by the transmitter of the near end modem to return to the receiver of the near end modem. The near end echo is comprised of two components. The first component of the near end echo arises when a hybrid converts the two-wire transmitter and two-wire receiver, a total of four wires, to the two-wire local loop of the telephone network. The second component of the near end echo results when a hybrid converts the two-wire local loop to the four-wire loop of the telephone network.

The far end echo is also comprised of two components. The first component of the near end echo arises when a hybrid converts the four-wire network to a two-wire local loop. The second component arises when a hybrid converts the two-wire local loop to the four-wire connection within the receiving modem, the two-wire receiver and two-wire transmitter. This far end echo is less significant than the near end echo.

It is the role of an echo canceler to remove or minimize the echo component from the signal received at the near end modem receiver. The signal received by the modem receiver can be modeled as follows:

$$y_n = r_n + z_n$$

Where $y_n$ is the data signal received by the receiver. It is comprised of $r_n$, which is the actual signal transmitted from a remote modem or source, and $z_n$, which is the actual echo component of the received signal. The echo canceler estimates $z_n$ to obtain $z'_n$ and then subtracts this value from the received signal $y_n$ to get the an estimate of the received signal, $r'_n$, which has the estimated echo removed. Below is an equation showing the estimated received signal with the estimated echo subtracted:

$$r'_n = y_n - z'_n$$

In a conventional echo canceler, the modem initiates a training sequence when the carrier signal is received, prior to receiving data or going into a data mode. During this training sequence, the echo canceler estimates the impulse response of the echo path by modeling the transmission channel as an adaptive digital filter, such as an FIR filter. Such adaptive FIR filters are known in the art to cancel echos, and described in *Data Communications*, supra, at 619–624. This calculated echo impulse response is then used to calculate an estimated echo. During the data mode when the modem is receiving data signals, the echo canceler within the modem receives data from the data transmitter of the modem. The echo canceler performs an operation on the transmitted data signal with the estimated echo channel impulse response signal to obtain an estimated echo signal, which is then subtracted from the data received from a remote modem as discussed above.

Two commonly used methods to estimate the echo path impulse response are the LMS and Recursive Least Squares (RLS) algorithms. The LMS algorithm adjusts the calculated values to minimize the error between the actual echo signal ($z_n$) at time n and the estimated echo signal ($z'_n$). The RLS algorithm converges about 10 times faster than the LMS algorithm. However, the LMS algorithm is preferred over the RLS algorithm because the LMS algorithm has significantly less computational complexity. For instance, setting N as the number of data taps or length of the data sequence to sound the echo channel, the RLS algorithm requires $N^2$ computational steps, whereas the LMS method only requires N computations. One attempt to reduce computational complexity has been the use of Fast Kalman algorithms that have computational complexities of 7–8 N. Although the Fast Kalman method may converge quickly, it is problematic because it exhibits high sensitivity to roundoff and other errors.

SUMMARY OF THE DISCLOSURE

It is an object of the present invention to estimate a discrete echo channel impulse response using an algorithm having the low computational complexity of an LMS algorithm and the superior convergence properties of RLS algorithms.

This object can be achieved in a modem having a transmitter, receiver, and echo canceler. During a training sequence prior to dual mode transmission, the transmitter generates a data sequence of length N including data samples $d_{(n)}$. This data sequence is selected such that a data matrix formed from data vectors comprised of the generated data samples $d_{(n)}$ produces a data matrix diagonal to the Nth iteration. Also during this training sequence, the transmitter generates a signal to sound the echo channel which returns to the modem as echo $z_{(n)}$.

Based on these values, the selected data sequence generated by the transmitter $d_{(n)}$ and the sounded echos $z_{(n)}$, the echo canceler implements a normalized LMS algorithm based on the under-determined approach to estimate the discrete echo channel impulse response $x_{(n)}$. In the normalized LMS, the algorithm runs for N iterations. This echo impulse response has convergence properties similar to RLS, yet realizes this convergence with significantly less computational complexity than that used by the RLS algorithm.

In a further embodiment, iterations can be performed beyond N. In such case, error correction terms can be added to the equation for estimating the echo impulse response. By going beyond N iterations to estimate the echo impulse response, the normalized algorithm can match exactly the superior convergence rate of RLS for calculating the echo impulse response.

DETAILED DESCRIPTION OF PREFERRED EMBODIMENTS

Figure 1:
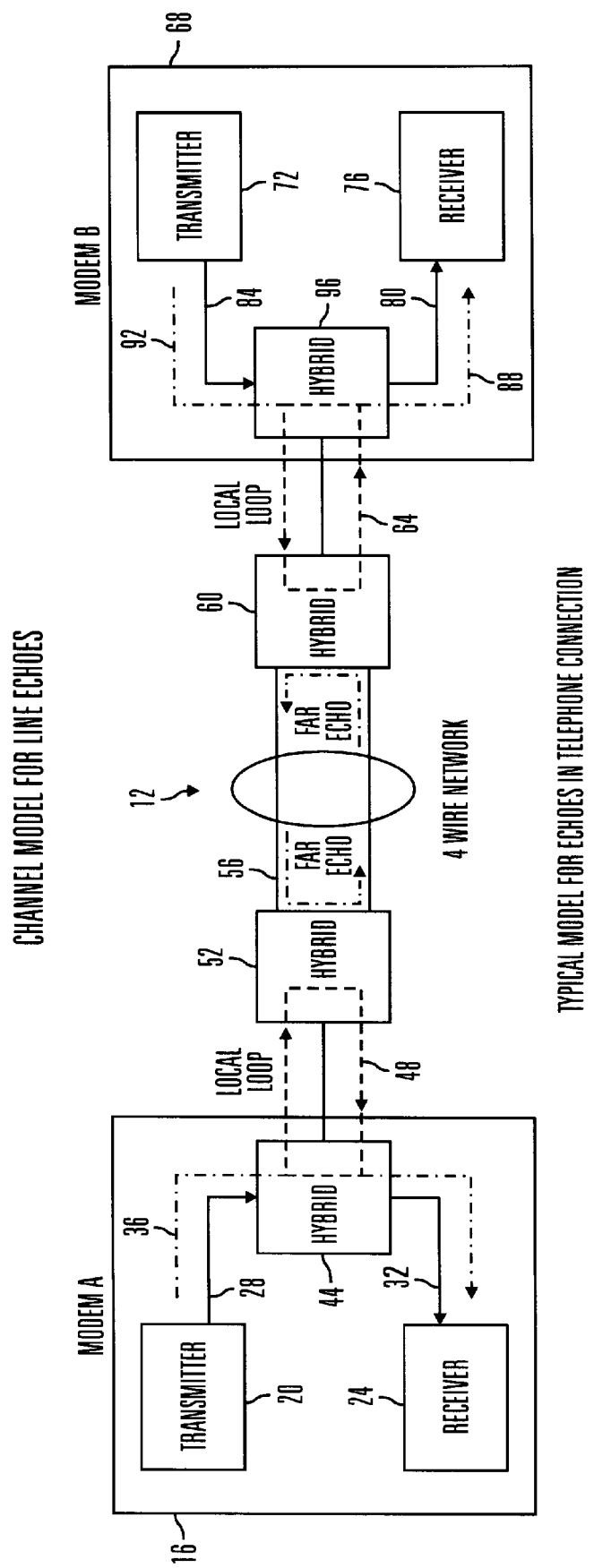
FIG. 1 schematically illustrates the channel model for line echos in a telephone network.

FIG. 1 shows a model of how modems are linked with a telephone network channel 12 and used for the transmission of digital data. Two modems, a near end modem 16 and a far end modem 68, are connected to the telephone network. The near end modem 16 includes a transmitter 20 and receiver 24 and the far end modem 68 also includes a transmitter 72 and receiver 76. The transmitter 72 of the far end modem 68 communicates digital data over the channel 12 to the receiver 24 of the near end modem 16. Similarly, the transmitter 20 of the near end modem 16 transmits data over the channel 12 to the receiver 76 of the far end modem 68.

In the near end modem 16, a transmitting two-wire pair 28 is connected to transmitter 20 and a receiving two-wire pair 32 is connected to the receiver 24. The transmitting two-wire pair 28 and receiving two-wire pair 32 (comprising a total of four wires) are converted by a hybrid 24 into a single analog two-wire pair 48, which forms a local loop of the telephone network and transmits in both directions at the same time.

At hybrid 44, an impedance mismatch is formed due to design and hardware limitations. Due to this impedance mismatch, a portion of the signal passing through the transmitting two-wire pair 28 travels back through the receiving two-wire pair 32 as an echo. This echo is part of what is known as the near end echo. Path 36 illustrates how a fraction of the transmitted signal from transmitter 20 returns to the receiver 24.

With reference to FIG. 1, a hybrid 52 converts the two-wire near end local loop 48 to a four-wire network loop 56. This conversion further adds to the near end echo received by receiver 24.

A far end echo arises as a result of two conversions. The first component of the far end echo arises as a result of hybrid 60 converting the four-wire network 56 of the telephone network to the two-wire local loop 64. The second component arises as a result of hybrid 96 converting the two-wire local loop 64 to the four-wires made up of the two-wire transmitting pair 84 and two-wire receiving pair 80.

In the far end modem 42, the same echo situation occurs. The hybrid conversions at hybrids 96 and 60 contribute to the near end echo for the far end modem 42, and the conversions at hybrids 44, 52 contribute to the far end echo for the far end modem 42. However, the echos received at the far end modem 42 are different than those echos received at the near end modem 16.

Figure 2:
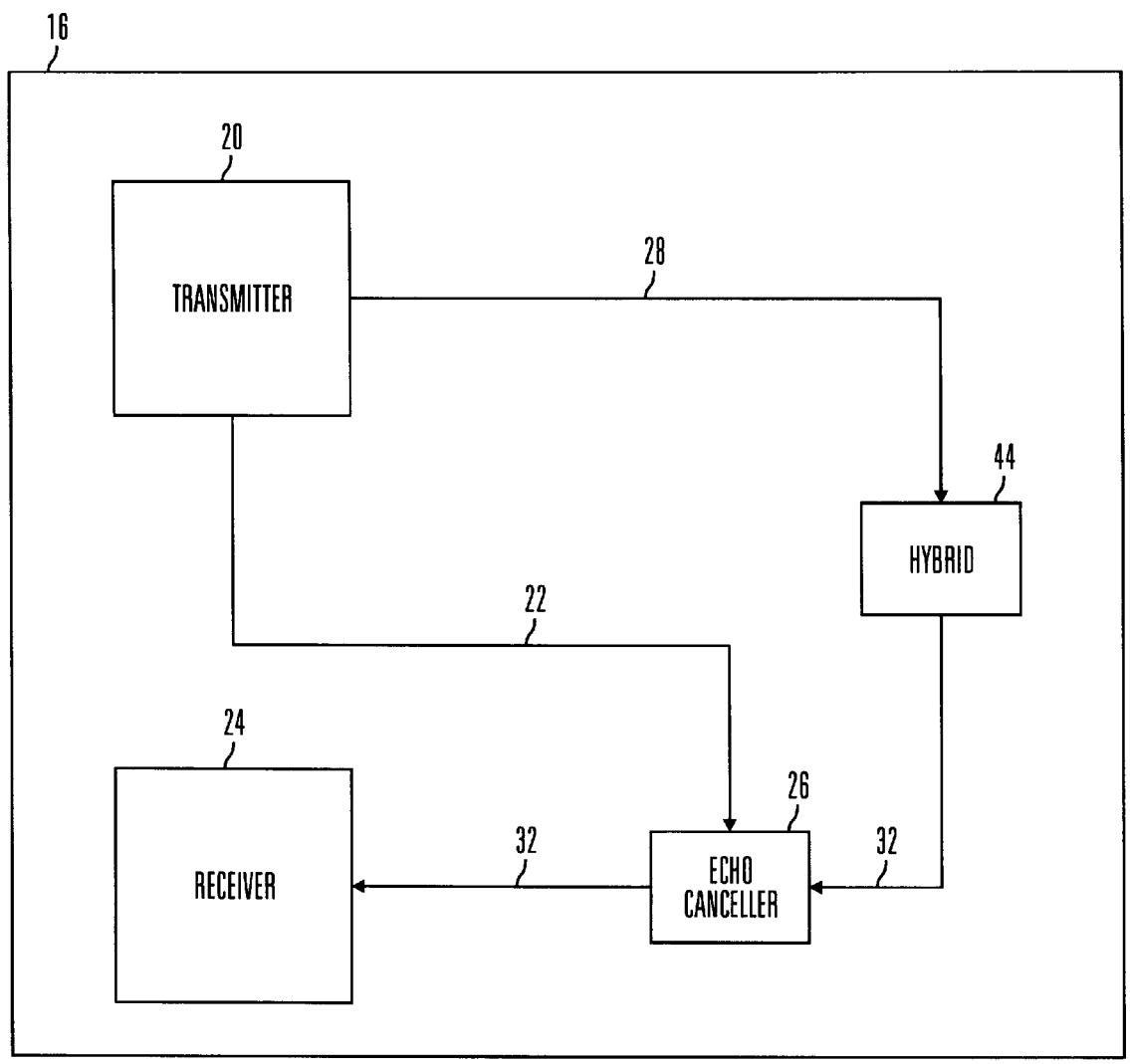
FIG. 2 schematically illustrates an echo canceler within a modem.

FIG. 2 shows preferred embodiments of how an echo canceler 26 may be employed in a modem. The echo canceler 26 may be comprised of a known adaptive FIR filter, such as those described in *Data Communications*, supra, at 619–624, for estimating the discrete time echo channel impulse response, referred to herein as $x'_n$. The echo canceler 26 may be implemented as a microprocessor operating under stored program control or in dedicated logic circuits or in some combination thereof. FIG. 2 shows the echo canceler 26 within the near end modem 16. The echo canceler 26 is coupled to receive data transmitted from the transmitter 20 and the data received by the modem via the receiving two wire pair 32.

After the modem connects to the telephone line, it initiates a training sequence before it receives data from a remote location. The echo canceler 26 estimates the echo channel impulse response $(x'_n)$ using two known variables, the input or data transmitted from the transmitter 20, referred to as $d_n$, and the echo $z_n$ generated when the echo channel is sounded during the training sequence.

An equation for estimating the echo $z_n$ at time n based on the data $d_n$ from the transmitter and the echo impulse response $x_n$ is modeled as follows:

$$Z_{(n)} = \sum_{J=0}^{N} x_{(j)} d_{(n-j)} + v_{(n)}$$

As discussed, during the training sequence, the echo canceler 26 knows $z_n$ and $d_n$. $v_n$ represents noise. During the approximation of the echo, the noise $v_n$ is assumed to have zero means, i.e., averages out to zero. Based on these known variables, the echo canceler estimates the echo channel impulse response, $x'_n$. To estimate $x'_n$, the discrete time equation is rewritten in matrix form to solve the linear equation, such that:

$$H_N \cdot x + v_n = z_n$$

where $$z_n = [z_{(0)} \ldots z_{(n)}]^T \quad v_n = [v_{(0)} \ldots v_{(n)}]^T$$

$$x = [x_{(0)} \ldots x_{(N)}]^T \quad H_n = [h_{(0)} \ldots h_{(n-N)}]^T$$

$$h_{(n)} = [d_{(0)} \ldots d_{(n)}]$$

The variable N is the length of the data sequence used to sound the echo channel and the number of iterations performed by the algorithm. Each data vector $h_{(n)}$ is comprised of a set of data samples generated by the transmitter 20. In preferred embodiments each $h_{(n)}$ data vector would include N data samples. For instance, if N=5, then the $h_{(n)}$ data vectors may have the following format:

$$h_{(1)} = [d_{(5)} d_{(4)} d_{(3)} d_{(2)} d_{(1)}]$$

$$h_{(2)} = [d_{(6)} d_{(5)} d_{(4)} d_{(3)} d_{(2)}], \text{ etc.}$$

It is a feature of the present invention to carefully select the data $d_n$, used in the linear equation by particularly selecting the data matrix $H_n$ and then employing an LMS algorithm to estimate the data echo impulse responses $x'_n$. In preferred embodiments, the data vector $h_{(n)}$ is selected such that it would produce a data matrix $H_N H_N^T$ that is full rank and generates a data correlation matrix that is diagonal at the Nth iteration.

To obtain $H_N H_N^T$ that is full rank and generates a data correlation matrix that is diagonal to the Nth iteration, the data sequence $h_{(n)}$ can be selected using a Constant Amplitude Zero Autocorrelation (CAZAC) sequence. Other methods for selecting the data sequences such that $H_N H_N^T$ is diagonal may also be used.

In a preferred embodiment the data values can be selected using polyphase codes with a periodic autocorrelation function that is zero everywhere except at a single maximum per period. If the data vector has length N, then the data values $d_k$ can be selected using the following equations.

First select a value M, which is a prime number relative to N, i.e., not divisible by N. If N is even, then the data samples $d_k$ in the data vector $h_{(n)}$ used during the training sequence can be calculated with the following equation involving complex numbers:

$$d_k = \exp\left(i\frac{M\pi k^2}{N}\right)$$

If N is odd, then the data samples $d_k$ in the data vector $h_{(n)}$ used during the training sequence can be calculated with the following equation involving complex numbers:

$$d_k = \exp\left(i\frac{M\pi k(k+1)}{N}\right)$$

These data samples $d_k$ may be calculated by a processor and inputted to the transmitter 20 for further transmittal to the echo canceler 26. Alternatively, these calculated data samples $d_k$ may be stored in a look-up table in a memory.

When this carefully selected data sequence is applied to the under-determined system algorithm, the update equation for estimating the echo impulse response ($x'_n$) reduces down to:

$$x'_n = x'_{n-1} + \frac{h_{(n)}^T}{h_n \cdot h_{(n)}^T}(z_{(n)} - h_{n-1} \cdot x'_{n-1})$$

The component $$(z_{(n)} - h_{n-1} x'_{n-1})$$

represents the adaptation or error component used by the echo canceler.

The echo impulse channel estimates generated using this method and data selection technique will minimize mean square errors between the calculated echo and estimated echo, wherein each subsequent iteration converges toward a better approximation. Moreover, using the normalized LMS algorithm with the carefully selected data matrix results in the same rapid convergence properties of the RLS method up to the first N iterations. Still further, this normalized LMS algorithm accomplishes such results with the computational complexity of an LMS algorithm as opposed to the far more computationally complex RLS method. The above algorithm is also known as the simplified orthogonal least means squares algorithm ("SOLMS")

After the training sequence, the modem enters data mode and begins receiving data. As discussed, the data received is referred to as $y_n$. The data signal can be represented as:

$$y_n = r_n + z_n$$

The goal is to estimate $r_n$ or the received signal. The estimated echo, $z'_n$, is determined in accordance with:

$$z'_{(n)} = \sum_{j=0}^{N} x'_{(j)} d_{(n-j)} + v_{(n)}$$

The echo canceler 26 uses the transmitted data from the transmitter 20 ($d_n$), selected in the manner discussed above, and the echo channel impulse response, $x'_n$, estimated during the training sequence, to estimate the echo $z'_n$. The estimated echo is then subtracted from the data signal received from the far end modem 68 ($y_n$) to estimate what the far end modem 68 transmitted ($r'_n$), or $$r'_n = y_n - z'_n$$

Assuming the echo channel is not time varying, in full duplex data transmission mode, there should be almost no change in the value of the echo impulse response calculated during the training sequence. In preferred embodiments, the echo canceler 26 will continue approximating the echo impulse response $x'_n$ during the data transmission mode using a standard LMS algorithm. Although the standard LMS algorithm is slower to converge, this is not problematic because time varying changes in the echo channel during data transmission mode are relatively gradual. Accordingly, any changes in the echo channel during data transmission mode may be tracked using the standard LMS algorithm.

In alternative embodiments, the echo impulse response $x'_n$ may be calculated out to a number of iterations greater than N. In preferred embodiments, an additional 5 times N iterations have been performed, when N=60. However, other values for N and multiples thereof for performing iterations may also be selected. For those iterations beyond N, an error value is used to calculate the echo impulse response $x'_n$. This new algorithm incorporating the error term is referred to as the orthogonal LMS algorithm ("OLMS"), which calculates the echo impulse response as follows:

$$x'_n = x'_{n-1} + \frac{1}{k} \cdot \frac{h_{(n)}^T}{h_n \cdot h_{(n)}^T}(err_1 - err_2)$$

where $$err_1 = z_{(n)} - h_{n-1} \cdot x'_{n-1}$$

$$err_2 = \frac{1}{k-1} \sum_{j=0}^{k-2} z_{(j \cdot N + (n \bmod N))} - h_{(n-1)} \cdot x'_{n-1}$$

and k=ceiling (n/N).

Note that the calculation for ($err_1 - err_2$) reduces to:

$$(err_1 - err_2) = z_{(n)} - \frac{1}{k-1} \sum_{j=0}^{k-2} z_{(j \cdot N + (n \bmod N))}$$

This equation including the error correction terms matches exactly the computations performed by the RLS algorithm. Moreover, the use of the error terms is averaging the received data and, thus, averages out the noise $v_n$. When there is no noise, the SOLMS algorithm closely approximates the OLMS algorithm. However, when there is noise, the OLMS provides a better approximation of the echo impulse response because the OLMS system averages out the noise. The reason for this is that the SOLMS and OLMS algorithms produce the same result for the first N iterations.

The OLMS algorithm, however, goes beyond N iterations, adding the error terms to better approximate the echo impulse response and average out the noise.

This OLMS algorithm using the errors within the equation matches exactly the computation performed by the RLS algorithm and, thus, possesses the same superior convergence rate of the RLS algorithm. Moreover, the OLMS algorithm has only a slightly higher computational complexity than the normalized LMS algorithm, and far less complexity than the RLS algorithm. After obtaining the estimated echo impulse path response using the OLMS algorithm, in data mode the echo canceler 26 would remove the estimated echo $z'_n$ and calculate the transmitted signal $r'_n$ as discussed above.

When implemented, the OLMS and SOLMS algorithms can run with N=60. If the OLMS algorithm is used, an additional 5 N iterations can be performed, adding up to a total of 300 (6×50) iterations. This is more effective than the typical implementation using the standard LMS algorithm which often uses 2000 iterations (N=2000) during the training sequence. Setting N=50 for the OLMS and SOLMS algorithms is usually sufficient to converge the echo impulse response such that the MMSE is reached. In alternative embodiments N can be set at any other sufficient value to minimize errors in calculating the echo impulse response. For example, in the embodiment illustrated in FIGS. 3 and 4, N is set at 16.

In alternative embodiments, instead of performing a predetermined number of iterations, the training sequence will continue to perform iterations until the echo impulse response $x'_n$ appropriately converges. This means that at a particular iteration the value $x'_n - x'_{n-1}$ reaches a low enough threshold such that the estimation of the echo impulse response has sufficiently converged.

Figure 3:
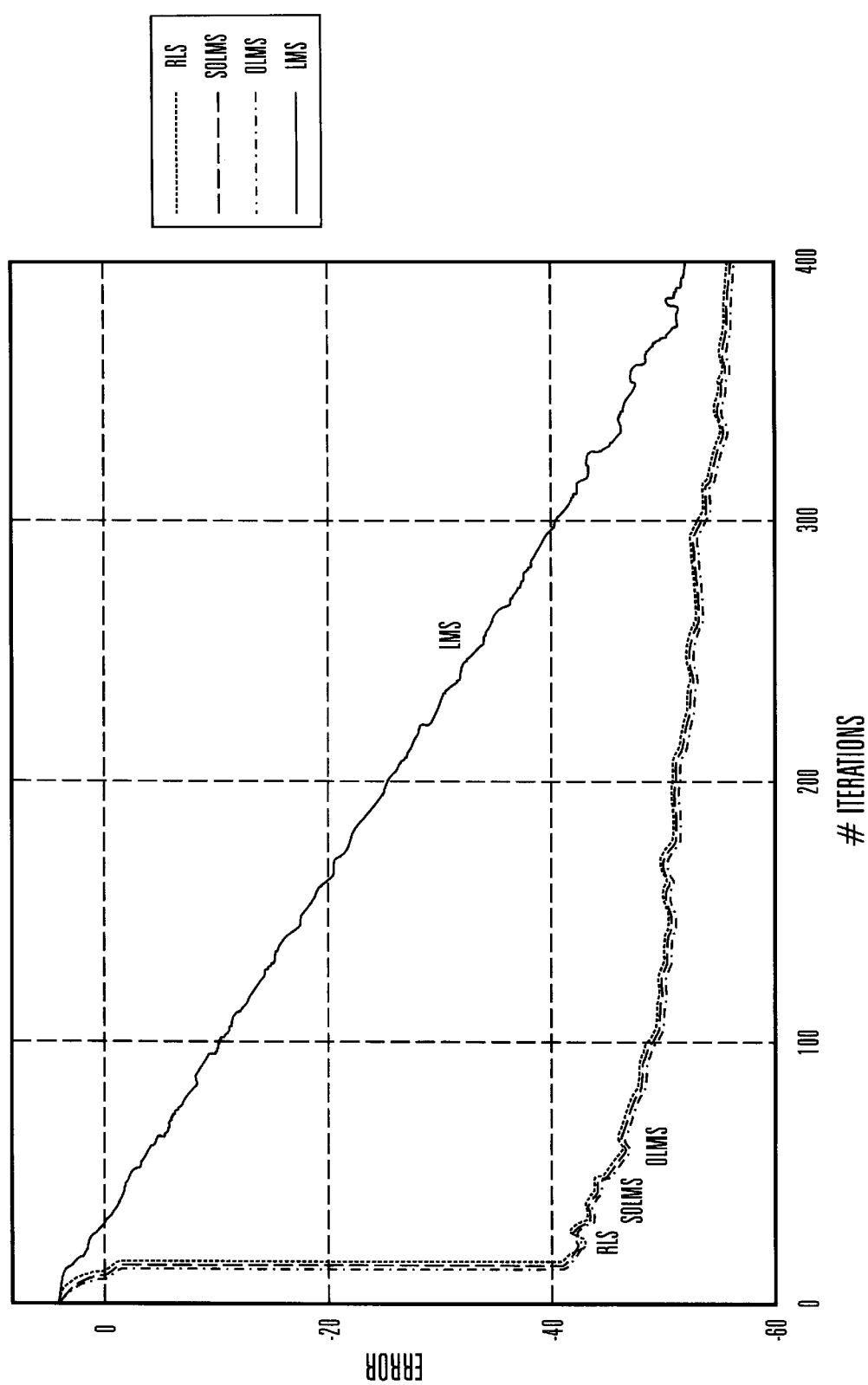
FIG. 3 provides a convergence performance comparison for the OLMS, SOLMS, RLMS, and simplified LMS algorithms.

FIG. 3 illustrates the convergence results for the OLMS, SOLMS, RLS, and standard LMS algorithms, wherein the length of the data sequence used to sound the echo channel was set to N=16. The number of iterations performed was plotted versus the $error^2 = (x - x'_n)^T (x - x'_n)$. As illustrated, both the OLMS and SOLMS algorithms feature rapid convergence speed, matching that of the RLS algorithm, and exhibited superior convergence to the traditional LMS method. In fact, as shown in FIG. 3, in 400 iterations, the LMS algorithm approached the convergence achieved by the SOLMS and OLMS in approximately 100 iterations.

Figure 4:
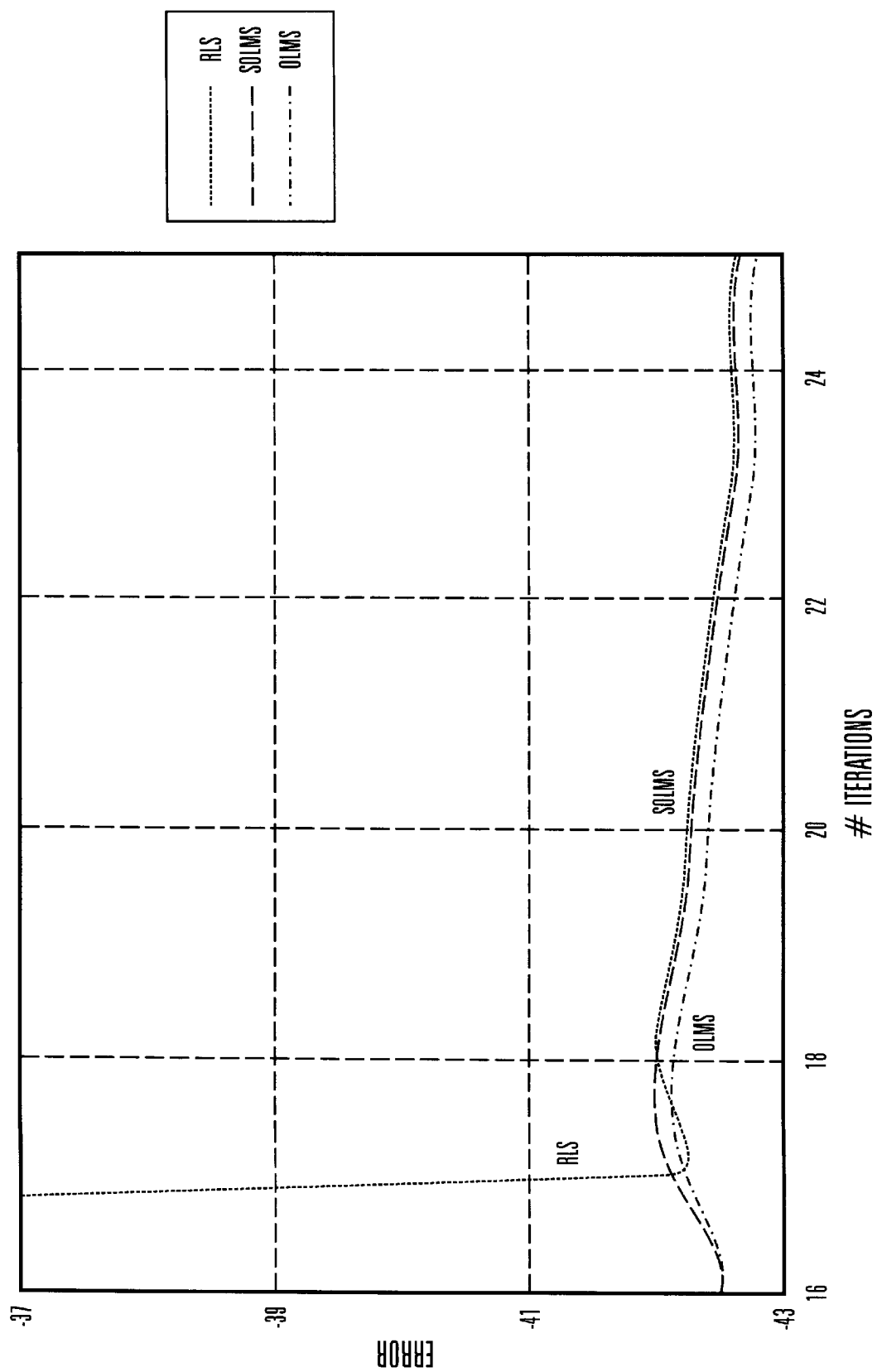
FIG. 4 provides a convergence performance comparison of the RLS, OLMS, and SOLMS algorithms.

FIG. 4 provides further detail of the results of FIG. 3 for the first 24 iterations. As can be seen, the OLMS and SOLMS converged almost as rapidly as the RLMS. In fact, the OLMS and SOLMS approximated the convergence of RLMS after only 17 or so iterations.

We claim:

1. A method for estimating the echo impulse response, comprising:

transmitting with a transmitter a data sequence of length N to sound an echo channel, wherein said echo $z_n$ returns as a result of such sounding;

selecting data samples $d_n$ such that vector $h_n$ which is comprised of the data samples $d_n$ produces a data matrix which is diagonal to the Nth iteration;

receiving with an echo canceler the data samples $d_n$ and the echo $z_n$;

calculating with the echo canceler the echo impulse response $x'_n$ using a least means square algorithm and the data vector $h_n$ of data samples $d_n$ and the sounded echo $z_n$, wherein the echo canceler estimates the echo impulse response $x'_n$ with the following equation:

$$x'_n = x'_{n-1} + \frac{h_{(n)}^T}{h_n \cdot h_{(n)}^T}(z_{(n)} - h_{n-1} \cdot x'_{n-1})$$

wherein the echo impulse response $x_n$ is calculated out to N iterations.

2. The method of claim 1, wherein N=50.

3. A method for estimating the echo impulse response, comprising:

transmitting with a transmitter a data sequence of length N to sound an echo channel, wherein said echo $z_n$ returns as a result of such sounding;

selecting data samples $d_n$ such that vector $h_n$ which is comprised of the data samples $d_n$ produces a data matrix which is diagonal to the Nth iteration;

receiving with an echo canceler the data samples $d_n$ and the echo $z_n$;

calculating with the echo canceler the echo impulse response $x'_n$ using a least means square algorithm and the data vector $h_n$ of data samples $d_n$ and the sounded echo $z_n$, wherein the echo canceler estimates the echo impulse response $x'_n$ with the following equation:

$$x'_n = x'_{n-1} + \frac{1}{k} \cdot \frac{h_{(n)}^T}{h_n \cdot h_{(n)}^T}(err_1 - err_2)$$

wherein $$(err_1 - err_2) = z_{(n)} - \frac{1}{k-1}\sum_{j=0}^{k-2} z_{(j \cdot N + (n \bmod N))}$$

wherein k=ceiling (n/N); and calculating the echo impulse response $x'_n$ in more than N Iterations.

4. The method of claim 3, wherein the echo impulse response is calculated out to a multiple of N iterations.

5. The method of claim 4, wherein the estimated echo $z'_n$ is calculated by the echo canceler as follows:

$$Z'_{(n)} = \sum_{J=0}^{N} x'_{(j)} d_{(n-j)}$$

6. The method of claim 3, wherein the echo impulse response is calculated for 6 times N iterations.

7. A method for estimating the echo impulse response, comprising:

transmitting with a transmitter a data sequence of length N to sound an echo channel, wherein said echo $z_n$ returns as a result of such sounding;

selecting data samples $d_n$ such that vector $h_n$ which is comprised of the data samples $d_n$ produces a data matrix which is diagonal to the Nth iteration;

receiving with an echo canceler the data samples $d_n$ and the echo $z_n$;

calculating with the echo canceler the echo impulse response $x'_n$ using a least means square algorithm and the data vector $h_n$ of data samples $d_n$ and the sounded echo $z_n$ wherein the echo canceler estimates the echo impulse response $x'_n$ with the following equation:

$$x'_n = x'_{n-1} + \frac{h^T_{(n)}}{h_n \cdot h^T_{(n)}} (z_{(n)} - h_{n-1} \cdot x'_{n-1})$$

for N iterations; and wherein the echo canceler estimates the echo impulse response $x'_n$ with the following equation:

$$x'_n = x'_{n-1} + \frac{1}{k} \cdot \frac{h^T_{(n)}}{h_n \cdot h^T_{(n)}} (err_1 - err_2)$$

wherein $$(err_1 - err_2) = z_{(n)} - \frac{1}{k-1} \sum_{j=0}^{k-2} z_{(j \cdot N + (n \, modulo \, N))}$$

wherein k=ceiling (n/N); and for iterations in excess of N.

* * * * *